(12) United States Patent
Scheideler et al.

(10) Patent No.: US 10,725,982 B2
(45) Date of Patent: Jul. 28, 2020

(54) KNOWLEDGE GRAPH NODE EXPIRATION

(71) Applicant: INTERNATIONAL BUSINESS MACHINES CORPORATION, Armonk, NY (US)

(72) Inventors: Tim U. Scheideler, Schoenenberg (CH); Thomas Snellgrove, Wakefield, MA (US); Stefan Ravizza, Wallisellen (CH); Andrea Giovannini, Zürich (CH); Florian Graf, Zürich (CH); Stefan Mayer, Gundelfingen (DE); Erik Rueger, Ockenheim (DE)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 15/817,802

(22) Filed: Nov. 20, 2017

(65) Prior Publication Data
US 2019/0155926 A1    May 23, 2019

(51) Int. Cl.
*G06F 16/00*    (2019.01)
*G06F 16/215*   (2019.01)
*G06F 16/901*   (2019.01)

(52) U.S. Cl.
CPC ........ *G06F 16/215* (2019.01); *G06F 16/9024* (2019.01)

(58) Field of Classification Search
CPC .... G06F 16/215; G06F 16/9024; G06F 16/36; G06F 16/9027; G06F 16/901;
(Continued)

(56) References Cited

U.S. PATENT DOCUMENTS 10,127,511 B1 * 11/2018 Epstein ............. G06Q 10/0635
2003/0177136 A1 * 9/2003 Alpert ..................... G06N 5/02
(Continued)

FOREIGN PATENT DOCUMENTS

| WO | 2015175931 A1 | 11/2015 |
| WO | 2015175936 A1 | 11/2015 |
| WO | 2016028446 A1 | 2/2016 |

OTHER PUBLICATIONS

Elseidy et al., "GRAMI: Frequent Subgraph and Pattern Mining in a Single Large Graph", 40th International Conference on Very Large Data Bases, Sep. 1-5, 2014, Proceedings of the VLDB Endowment, vol. 7, No. 7, pp. 517-528.
(Continued)

*Primary Examiner* — Anh Ly
(74) *Attorney, Agent, or Firm* — Michael A. Petrocelli

(57) ABSTRACT

A method and system for deleting a node of a knowledge graph may be provided. The method comprises receiving knowledge graph data comprising nodes and edges, determining a first relevance degree value for a node and a second relevance degree value for the node, combining the first and the second relevance degree value and marking the node as deletable if the final relevance degree value is above a predefined relevance threshold value. The method comprises further applying queries against the knowledge graph, wherein at least a certain number of such queries invokes accessing of a node, marked as deletable, revising at least one of the first and second relevance degree value based on the accessing of the node marked as deletable, and deleting the node, marked as deletable, if over a predetermined period of time queries against the knowledge graph invoke no access of the node marked as deletable.

13 Claims, 11 Drawing Sheets

(58) Field of Classification Search
CPC .... G06F 16/00; G06F 17/28; G06F 17/30654;
G06F 17/30477; G06F 17/30303; G06F
17/30734; G06F 17/30766; G06F
17/30663; G06F 17/30958; G06F 15/18;
G06N 3/08; G06N 3/04; G06N 3/0427;
G06N 7/005; G10L 15/063; G11L 15/063;
H04L 63/1425; H04L 63/1416; G06G
17/30
See application file for complete search history.

(56) References Cited

U.S. PATENT DOCUMENTS

| | | | |
|---|---|---|---|
| 2007/0208693 A1* | 9/2007 | Chang | G06F 16/20 |
| 2012/0158039 A1* | 6/2012 | Angel | A61F 2/01 606/200 |
| 2013/0035996 A1* | 2/2013 | Frey | G06Q 10/10 705/14.4 |
| 2013/0138479 A1* | 5/2013 | Mohan | G06Q 10/10 705/7.33 |
| 2013/0332490 A1* | 12/2013 | Hu | G06N 5/02 707/798 |
| 2014/0304214 A1* | 10/2014 | Sakunkoo | G06F 16/367 706/55 |
| 2015/0347480 A1* | 12/2015 | Smart | G06F 16/2264 707/743 |
| 2016/0042355 A1* | 2/2016 | Wang | G06Q 20/4016 705/39 |
| 2016/0117413 A1 | 4/2016 | Botea et al. | |
| 2016/0179965 A1* | 6/2016 | Bhatia | G06F 16/9535 707/749 |
| 2017/0039527 A1 | 2/2017 | Rangan | |
| 2017/0076206 A1 | 3/2017 | Lastras-Montano et al. | |
| 2017/0161282 A1* | 6/2017 | Kemme | H04L 67/10 |
| 2017/0221240 A1* | 8/2017 | Stetson | G06T 11/206 |
| 2018/0039696 A1* | 2/2018 | Zhai | G06F 16/367 |
| 2018/0048661 A1* | 2/2018 | Bird | H04L 63/1416 |
| 2019/0095830 A1* | 3/2019 | Epstein | G06Q 30/02 |

OTHER PUBLICATIONS

Liu et al., "Reducing Million-Node Graphs to a Few Structural Patterns: A Unified Approach", 12th International Workshop on Mining and Learning with Graphs, Held in conjunction with KDD'16, Aug. 14, 2016—San Francisco, CA, 8 pages.

Wikipedia, a free encyclopedia, "Centrality", printed on Aug. 29, 2017, pp. 1-12, https://en.wikipedia.org/wiki/Centrality.

Mell et al., "The NIST Definition of Cloud Computing", Recommendations of the National Institute of Standards and Technology, Special Publication 800-145, Sep. 2011, 7 pages.

* cited by examiner

KNOWLEDGE GRAPH NODE EXPIRATION

FIELD OF THE INVENTION

The invention relates generally to a method for node expiration in a knowledge graph, and more specifically, to deleting a node of a knowledge graph. The invention relates further to a system for deleting a node of a knowledge graph, and a computer program product.

BACKGROUND

Cognitive computing, artificial intelligence or augmented intelligence, as well as machine learning, play currently a significant role in computer research and in practical implications. Such systems are predestinated to support humans in dealing with overwhelming amounts of data to make quick and solid decision, and this also in light in light of contradictory information details. Often, question answering (QA) technologies are applied to support such decision-making. Question answering technologies typically taken input question, analyze these, and return results indicative of the most probable answer to the input questions based on the knowledge stored in such system. Typically, the knowledge stored in data graphs is used as a basis. Data or facts are very often organized as nodes and relationships between them. Such knowledge graphs cover a wide range of applications, such as chemical, bio informatics, computer vision, social networks, text retrieval, web analysis, just to name a few. One of the characteristics of such knowledge graphs is that they can grow exponentially over time, become more and more complex and require more and more storage capacity. Mining these partially over-complex and sometimes outdated subtrees of knowledge graphs becomes very time and resource consuming such that it becomes more and more difficult to get quick responses to queries against these overloaded knowledge graphs.

SUMMARY

Several research and commercial systems, as mentioned above, are currently available. One of them is the IBM® Watson™ cognitive system which is an application of advanced natural language processing, information retrieval, knowledge representation and reasoning, as well as machine learning. The IBM® Watson™ system is built on IBM®'s deep QA technology used for hypothesis generation, massive evidence gathering, analysis and scoring. Deep QA takes an input question, analyzes it, and decomposes the question into constituent parts, and generates one or more hypothesis based on the decomposed question and results of a primary search of answer scores, performs hypothesis and evidence scoring based on a retrieval of evidence from evidence sources, performs synthesis of the one or more hypothesis, and based on trained models, performs a final merging and ranking to output an answer to the input question along with a confidence measure. However, although the systems progress in their development, also the underlying knowledge body may grow over-proportionally making it difficult to generate the answers including the confidence measure in a time expected by a typical average user.

According to one aspect of the present invention, a method for deleting a node of a knowledge graph may be provided. The method may comprise receiving knowledge graph data comprising nodes and edges. The edges may represent relationships between a subset of the nodes. The method may also comprise determining a first relevance degree value for a selected one of the nodes based on a combination of node parameters using a first relevance scoring model, determining a second relevance degree value for the selected node based on a combination of node parameters using a second relevance scoring model and combining the first relevance degree value and the second relevance degree value into a final relevance degree for the selected node.

Additionally, the method may comprise marking the selected node as deletable if the final relevance degree value is above a predefined relevance threshold value, applying queries against the knowledge graph, wherein at least a certain number of such queries invokes accessing of a node marked as deletable, revising at least one of the first relevance degree value and the second relevance degree value based on the accessing of the node marked as deletable, and deleting the node marked as deletable if over a predetermined period of time queries against the knowledge graph invoke no access of the node marked as deletable.

According to another aspect of the present invention, a system for deleting a node of a knowledge graph may be provided. The system may comprise a storage for storing a knowledge graph data comprising nodes and edges, the edges representing a relationships between a subset of the nodes, a first determining unit adapted for determining a first relevance degree value for a selected one of the nodes based on a combination of node parameters using a first relevance scoring model, a second determining unit adapted determining a second relevance degree value for the selected node based on a combination of node parameters using a second relevance scoring model, and a combination module adapted for combining the first relevance degree value and the second relevance degree value into a final relevance degree for the selected node.

Furthermore, the system may comprise a marking unit adapted for marking the selected node as deletable if the final relevance degree value is above a predefined relevance threshold value, a query module adapted for applying queries against the knowledge graph, wherein at least a certain number of such queries invokes accessing of a node marked as deletable, a revising system adapted for revising at least one of the first relevance degree value and the second relevance degree value based on the accessing of the node marked as deletable, and a deletion module adapted for deleting the node marked as deletable if over a predetermined period of time queries against the knowledge graph invoke no access of the node marked as deletable.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments have been described with reference to apparatus type claims.

However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention, are apparent from the examples of embodiments to be described hereinafter and are explained with reference to the examples of embodiments, but to which the invention is not limited.

Figure 1:
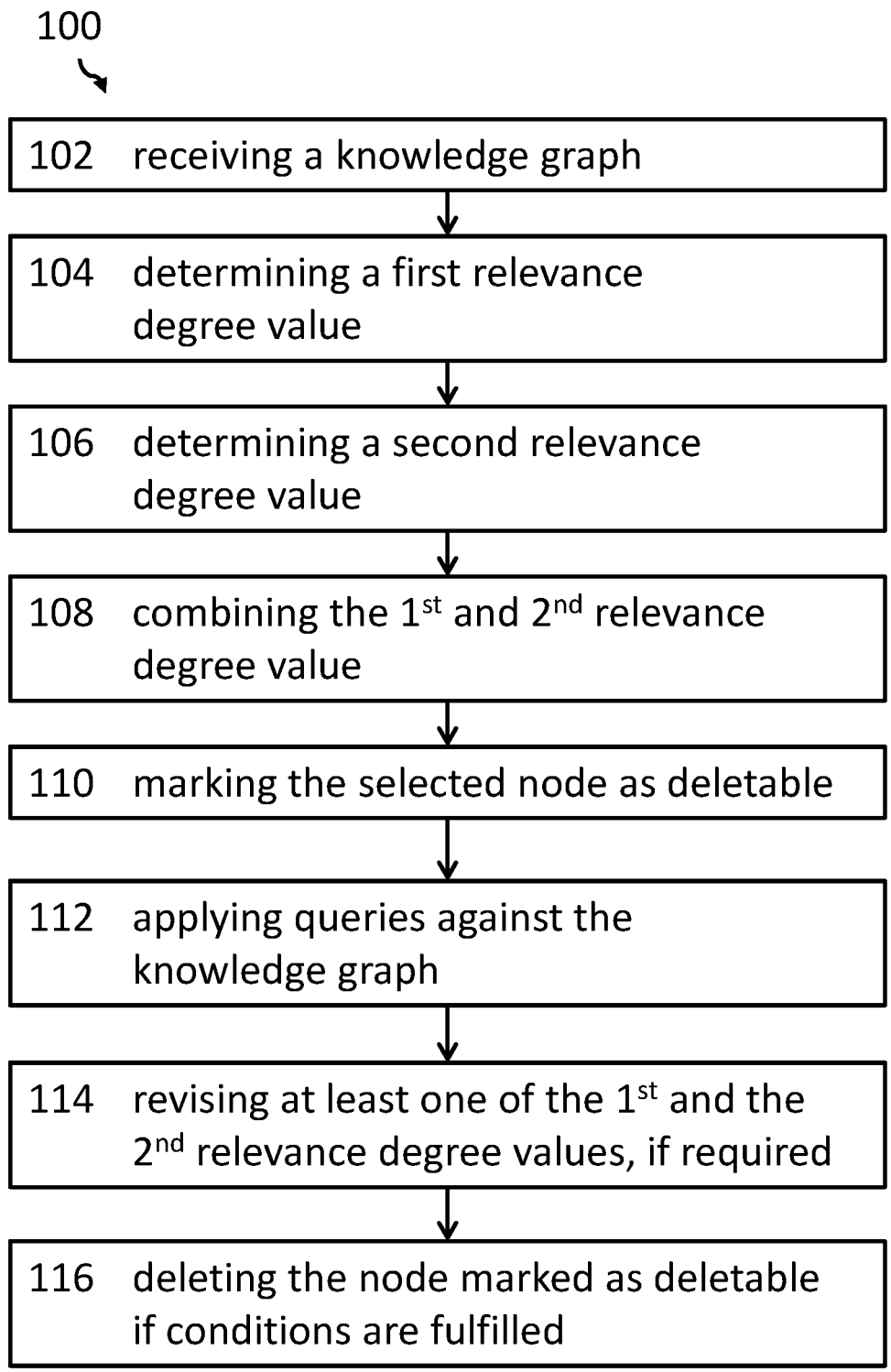

Preferred embodiments of the invention will be described, by way of example only, and with reference to the following drawings:

FIG. 1 shows an embodiment of a flowchart of the inventive method for deleting a node in a knowledge graph.

Figure 2:
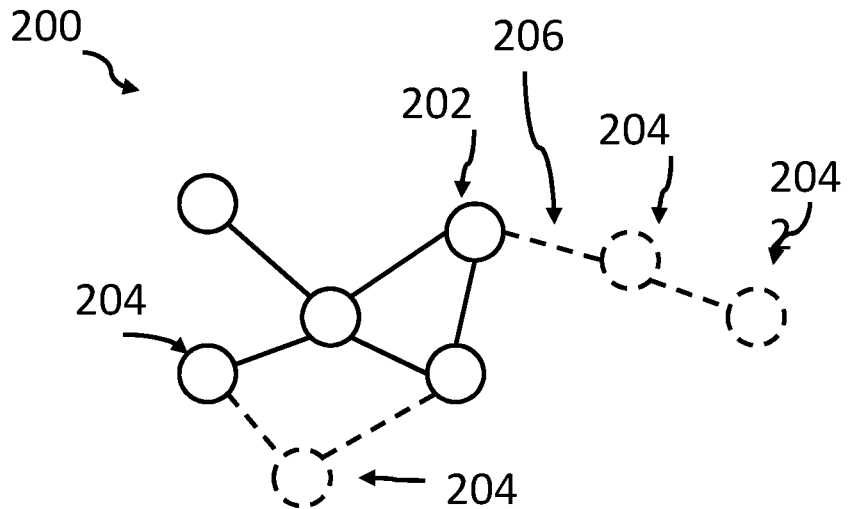

FIG. 2 shows a graph with an example of expired nodes in the knowledge graph.

Figure 3:
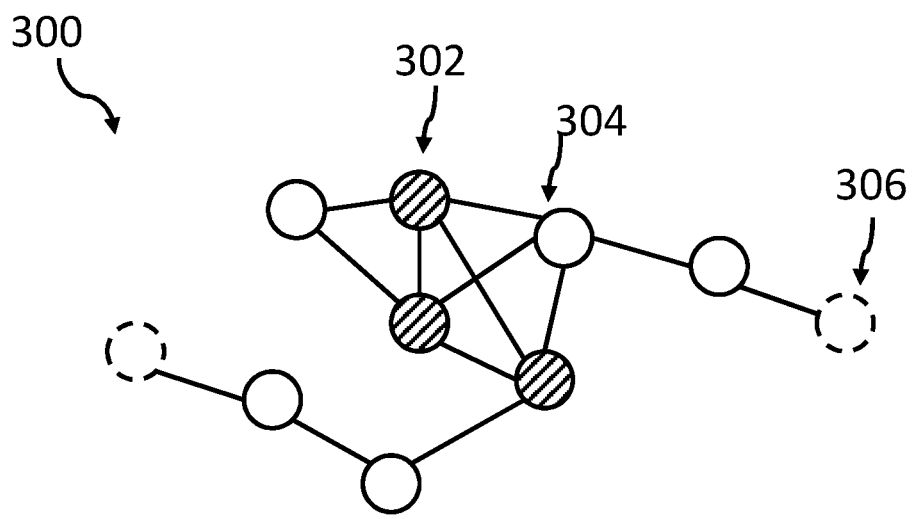

FIG. 3 shows an embodiment of how to measure the distance to a core node

Figure 4:
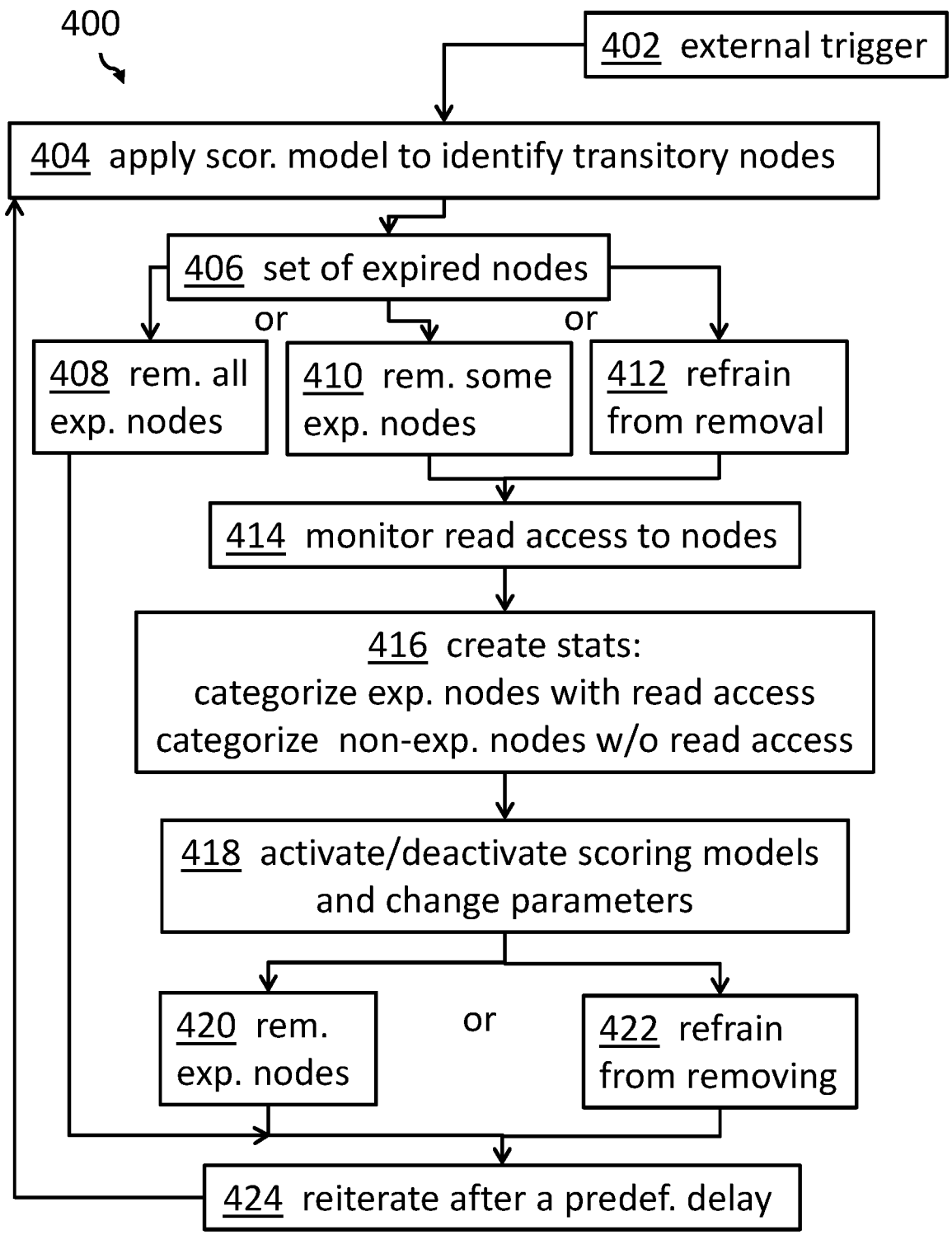

FIG. 4 shows an embodiment of a more technically detailed flowchart of the expiration process.

Figure 5:
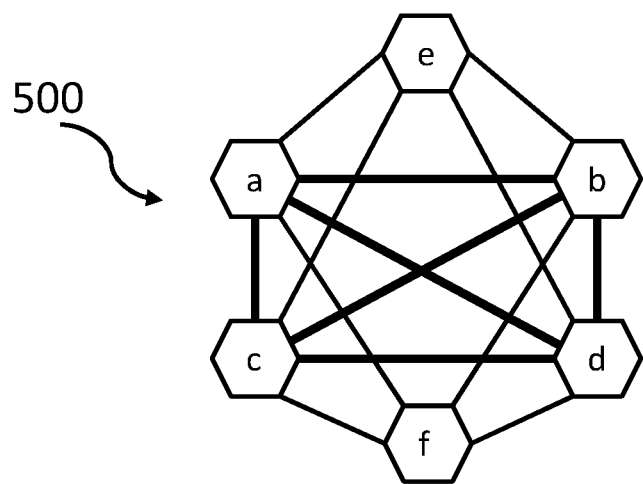

FIG. 5 shows an embodiment with scoring models for a knowledge graph.

Figure 6:
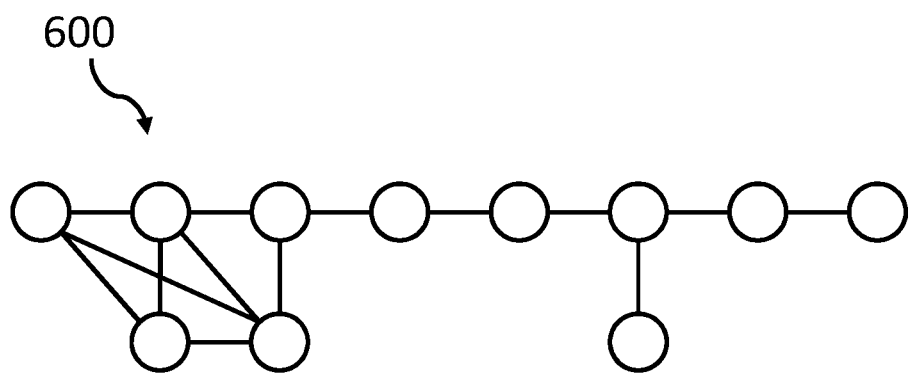

FIG. 6 shows an embodiment of a target knowledge graph to be evaluated.

Figure 7:
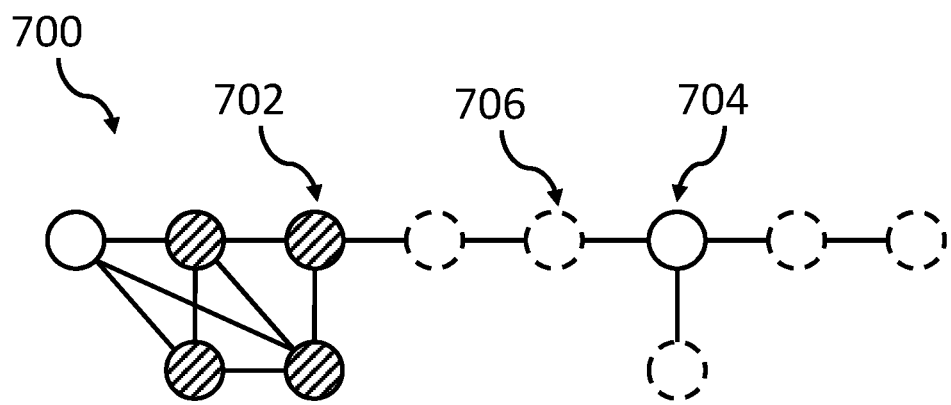

FIG. 7 shows an embodiment of an application of a scoring model to the target knowledge graph.

Figure 8:
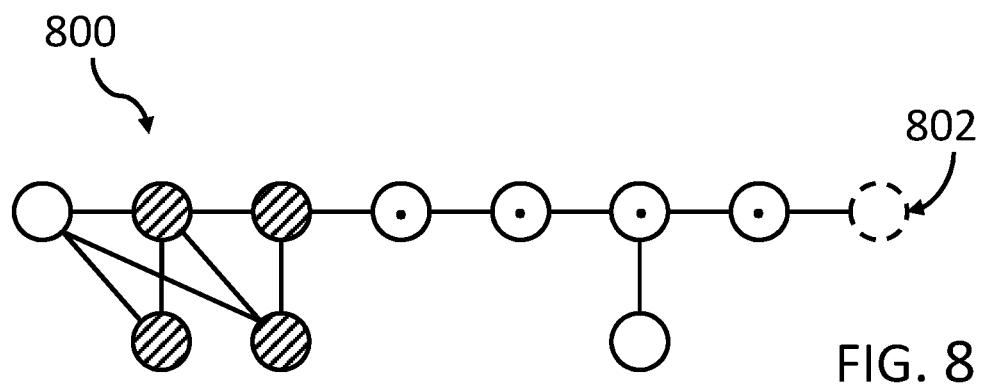

FIG. 8 shows an embodiment of an application of another scoring model to the knowledge graph.

Figure 9:
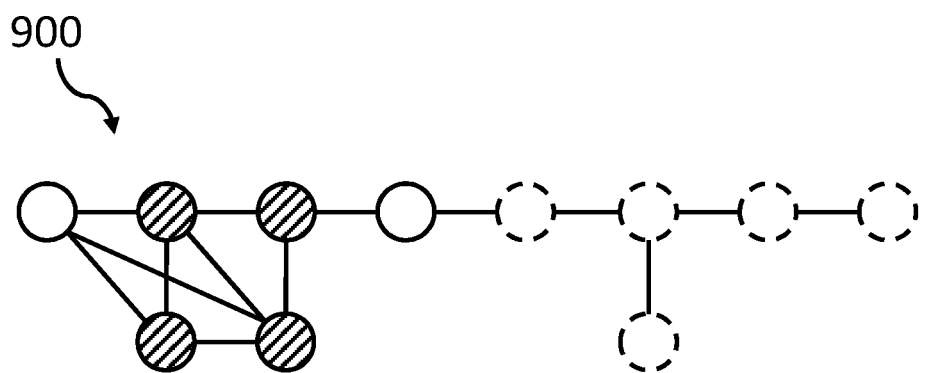

FIG. 9 shows an embodiment of an application of a further scoring model to the knowledge graph.

Figure 10:
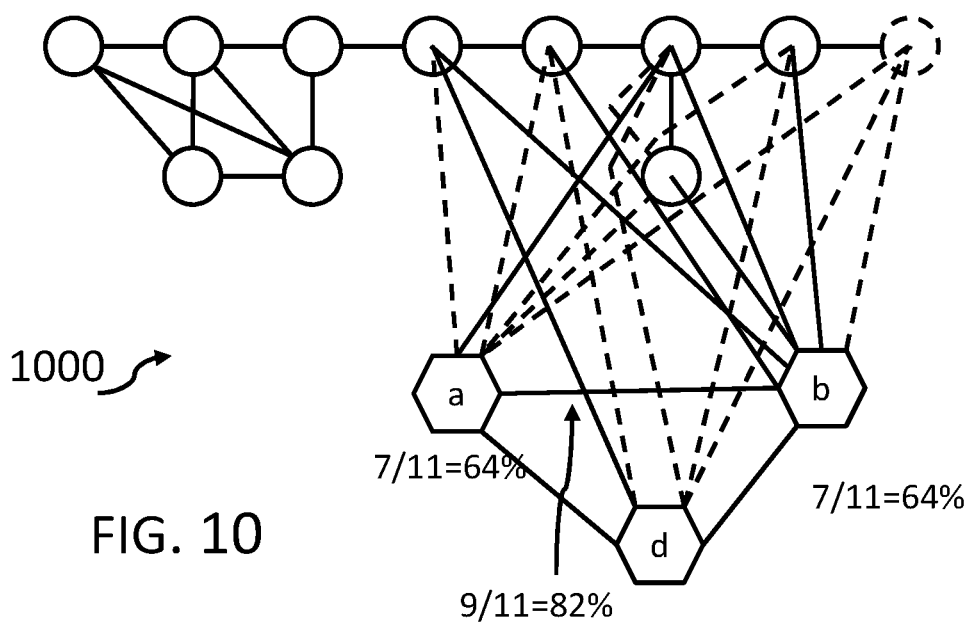

FIG. 10 shows an embodiment of linking the nodes of the target knowledge graph using examples of the various scoring models.

Figure 11:
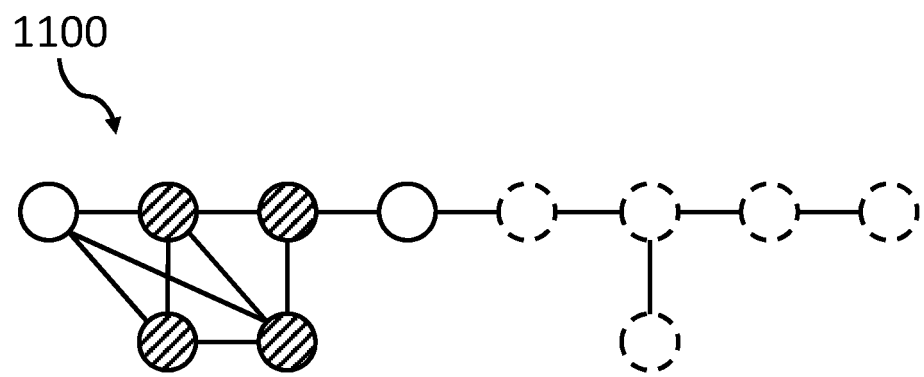

FIG. 11 shows an embodiment of an application of a scoring model using a predefined parameter to the knowledge graph.

Figure 12:
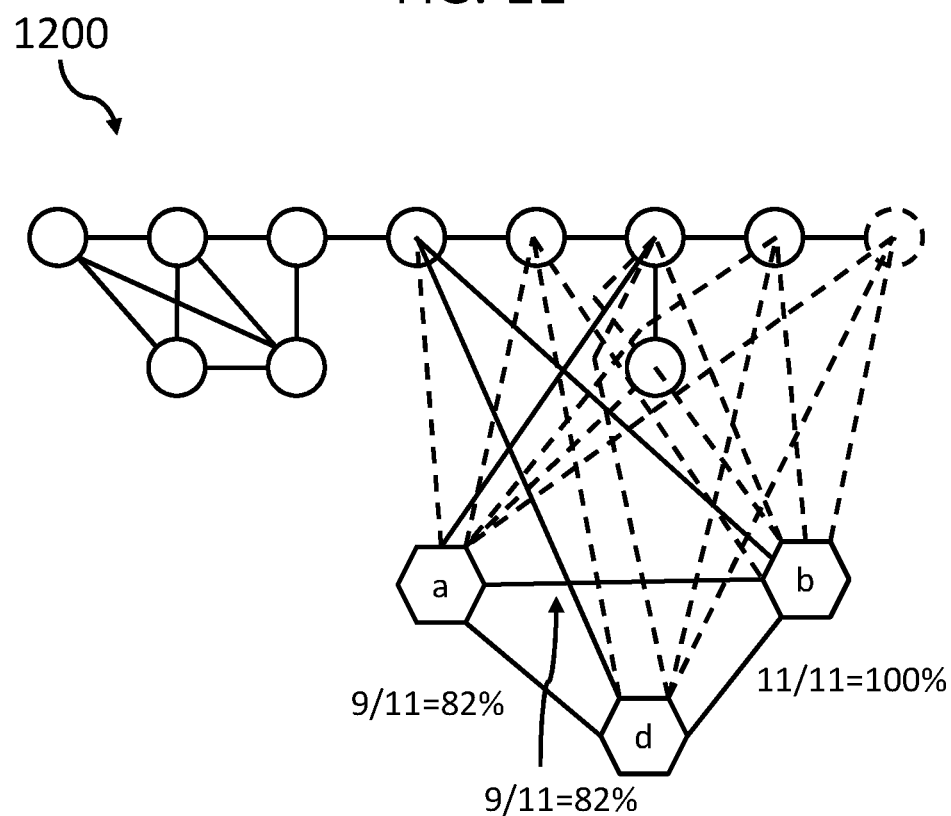

FIG. 12 shows an embodiment of linking the nodes of the target knowledge graph to method parameters after a change of parameters.

Figure 13:
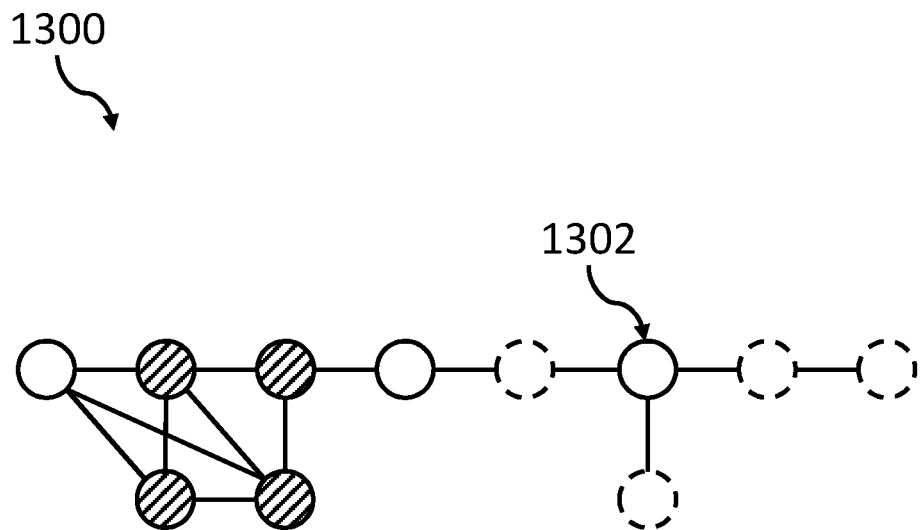

FIG. 13 shows an embodiment of how removing nodes can create an orphan node.

Figure 14:
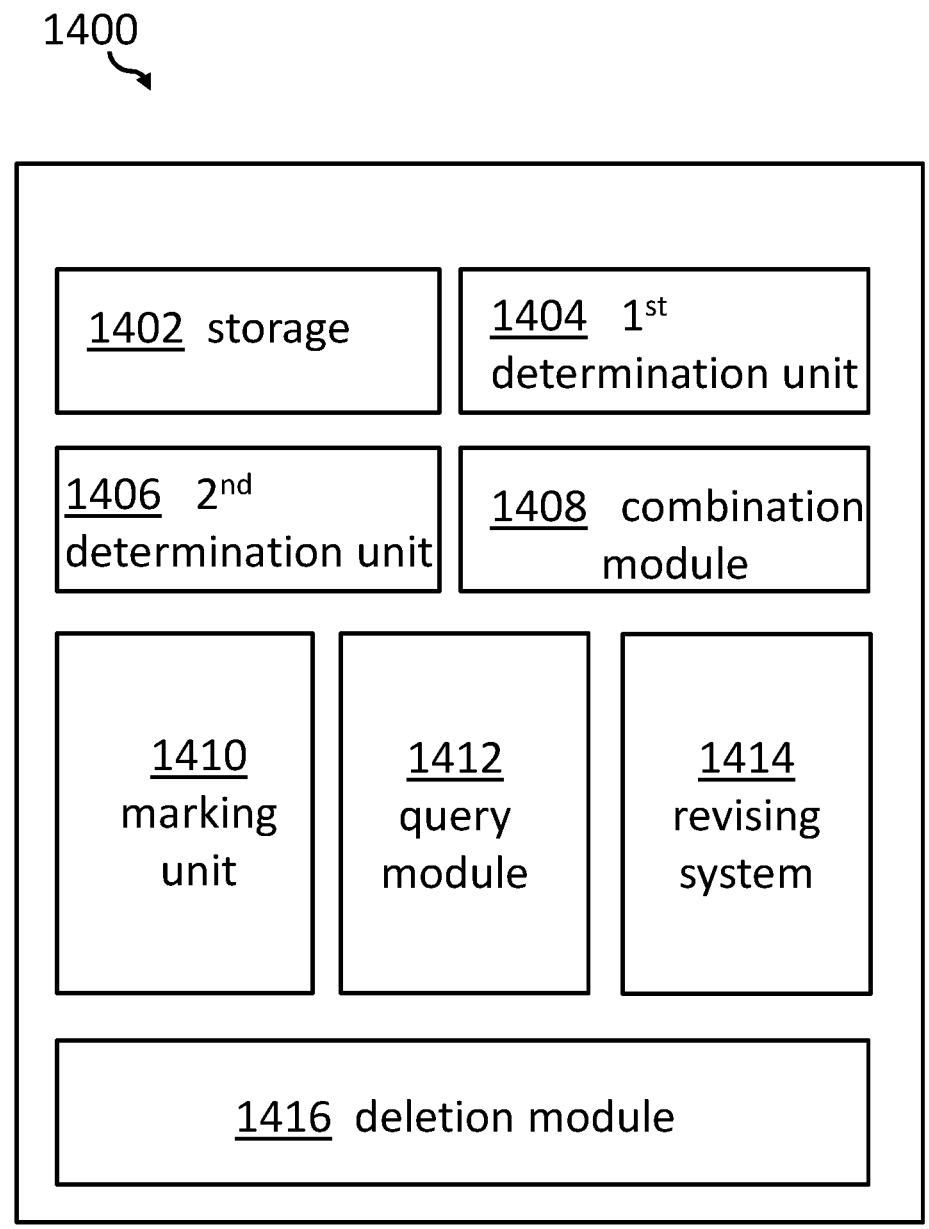

FIG. 14 shows a more abstract embodiment of the system for purging a node of a knowledge graph.

Figure 15:
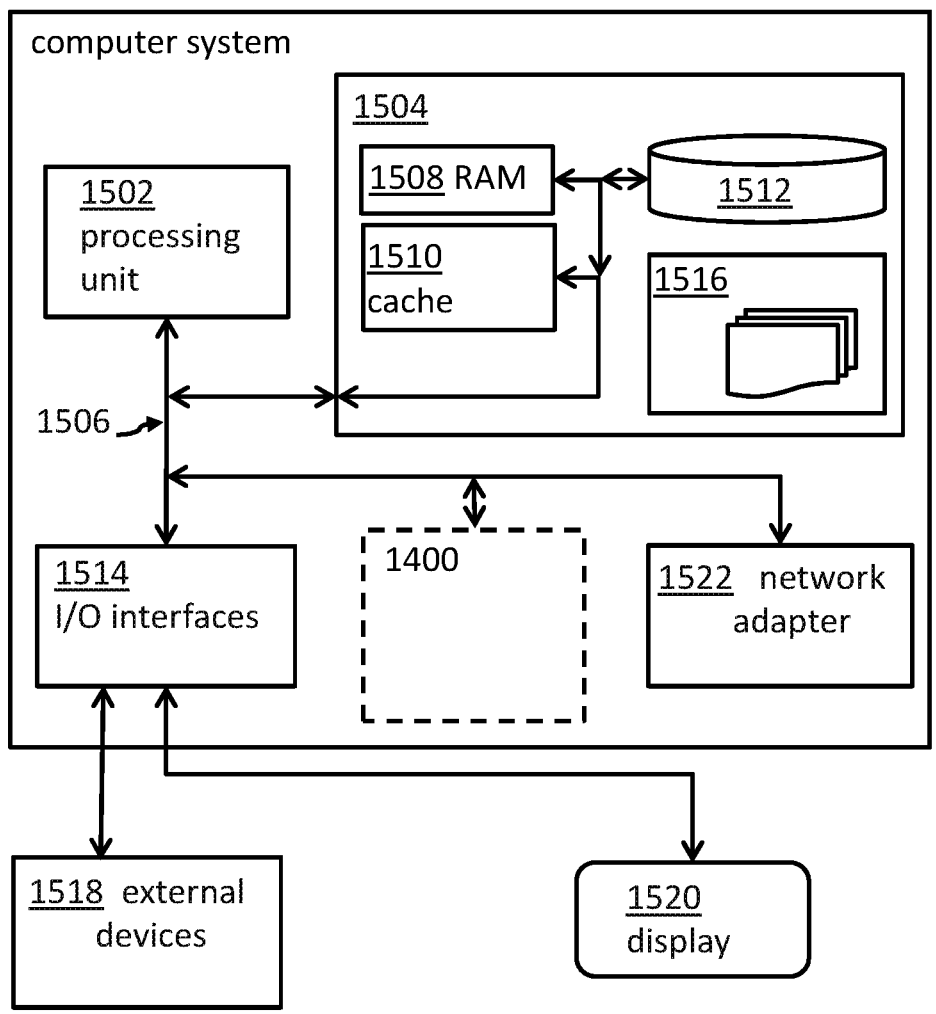

FIG. 15 shows an embodiment of a computing system comprising the system for purging a node of the knowledge graph.

Figure 16:
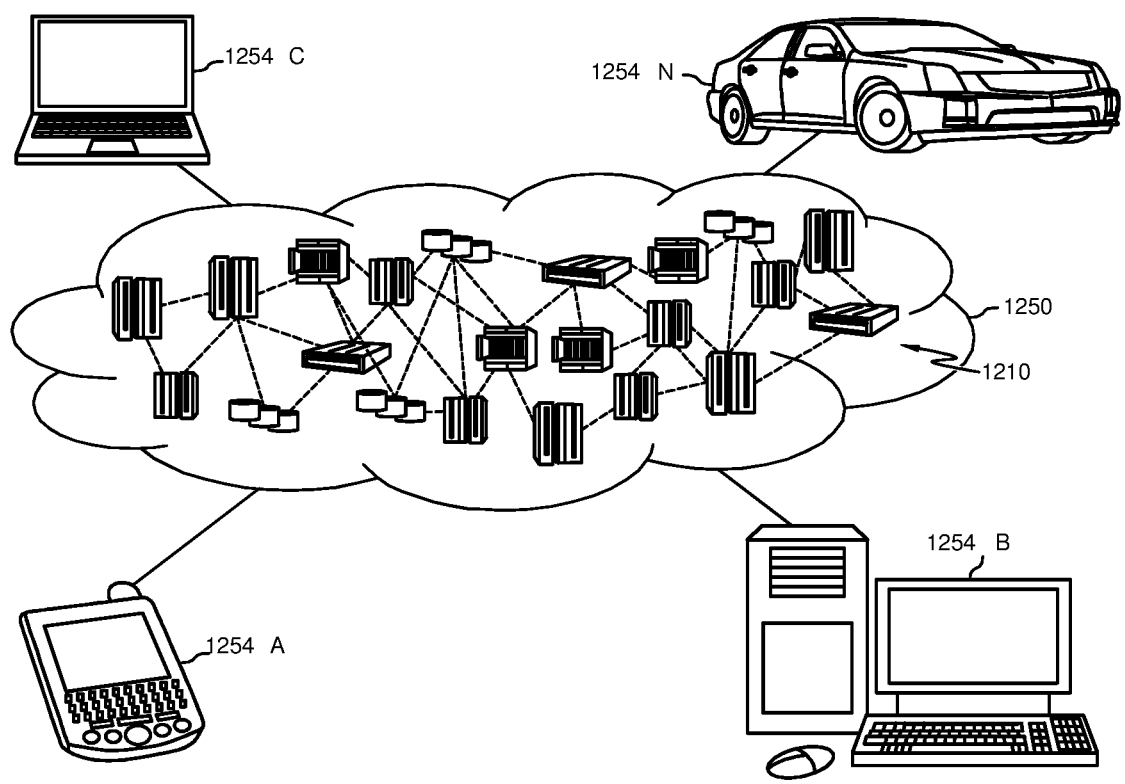

FIG. 16 is a functional block diagram depicting a cloud computing environment according to an embodiment of the present invention.

Figure 17:
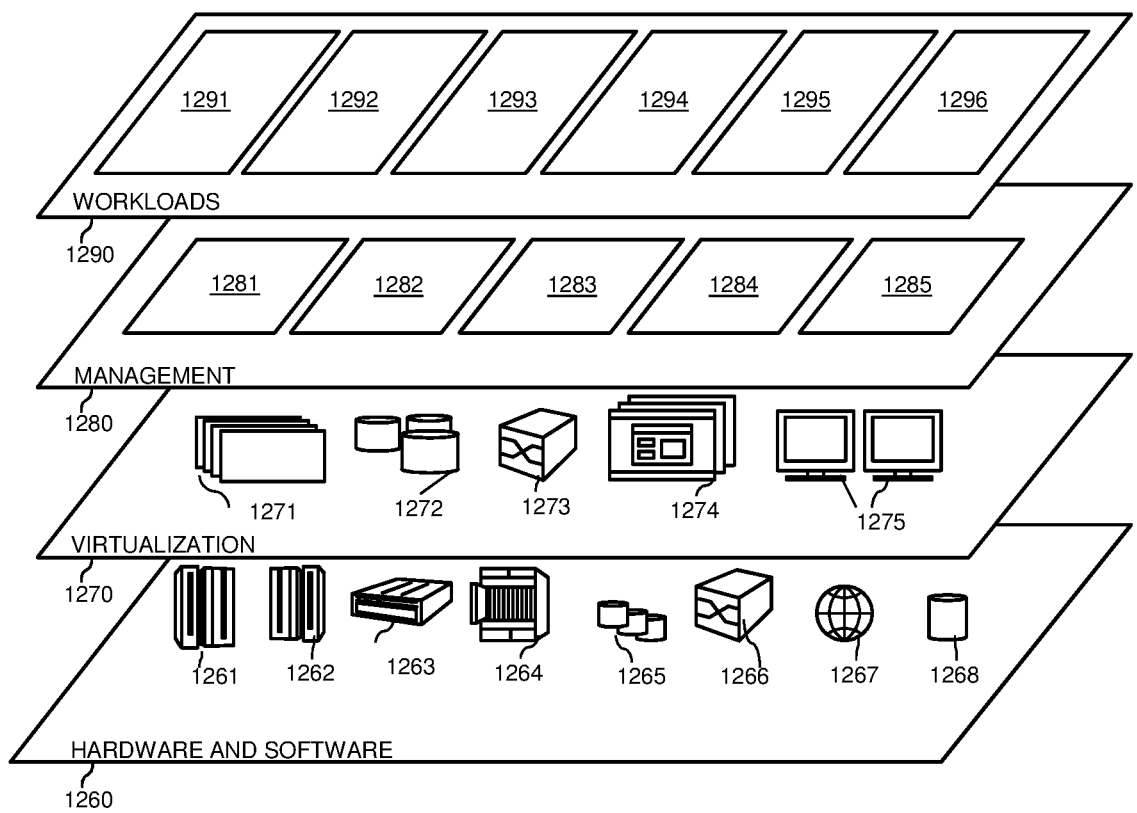

FIG. 17 is a diagram depicting abstraction model layers according to an embodiment of the present invention.

DETAILED DESCRIPTION

In the context of this description, the following conventions, terms and/or expressions may be used:

The term 'knowledge graph' may denote an ontology of a formal naming and definition of types, properties, and inter-relationships of the entities that really or fundamentally exist for a particular domain of discourse. It may thus be a practical application of philosophical ontology with a taxonomy. An ontology may compartmentalize the variables needed for some set of computations and establishes the relationships between them. The fields of artificial intelligence, the Semantic Web, systems engineering, software engineering, biomedical informatics, library science, enterprise bookmarking, and information architecture may all create ontologies to limit complexity and to organize information. The ontology may then be applied to problem solving technologies, by, e.g., question answering technologies. In the domain of knowledge graph computation, the knowledge density may be understood as the average number of attributes—also denoted as nodes—and binary relation—also denoted as edges—issued from a given entity, it is commonly measured in facts per entity.

The term 'nodes' may denote a fact or entity in the knowledge graph. Between different nodes relationships or links may exist. These links or relationships may also be denoted as 'edges'.

The term 'relevance degree value' may denote a relative measurement of the importance of a node in a knowledge graph. From a general understanding one may assume that the higher the relevance degree value is the more valuable the respective node may be for the knowledge graph. Different models and methods may be used to determine the relevance degree value by different scoring models. The relevance degree value may also differentiate between persistent or core nodes and nodes in the periphery of the knowledge graph. The here used underlying theoretical model assumes that nodes with a high relevance degree value have to remain in the knowledge graph, they are so to speak the persistent or core nodes. On the other hand side, those nodes having a low relevance degree value are the ones that may be deletable. A high relevance degree guarantees keeping a node in the knowledge graph, whereas a node, having a low relevance degree, has a high probability of being deleted.

The term 'node parameter' may denote a characteristic value representing an attribute of a node—e.g., persistent node—which may be profoundly linked to other nodes versus leaf nodes which may be only sparsely linked to other nodes.

The term 'relevance scoring model' may denote a determination method for deriving a relevance degree value for a selected node in a knowledge graph. Thus, the term 'relevance degree value' may denote the result of the related relevance scoring model.

The term 'second relevance scoring model' may denote another relevance scoring model if compared to a first relevance scoring model. The combination of relevance scoring models of different kinds may lead to a very reliable determination of those nodes that should be kept as part of the knowledge graph and those nodes that may be forgotten, i.e., deleted.

The term 'final relevance degree' may denote a combination of different result values of different relevance scoring models. Various methods may be used to combine the result values of the scoring models like: mean value, largest value, smallest value, weighted average value, etc.

The term 'deletable' may denote an attribute of a node. A node marked as deletable may be in an intermediate status. Depending on the circumstances, the node may finally be deleted or—after a predefined amount of time—the node may lose its deletable attribute and become a normal member—i.e., a normal node—of the knowledge graph. It may be noted that the status of a node—e.g., just created, transitory, persistent, marked as deletable, deleted—may change over the lifetime of the knowledge graph, i.e., the lifetime of the specific node.

The term 'distance of a node' may denote the number of hops required to move from the node in question to a persistent or core node. Each node between the node in question and nodes in between linked with edges may count as one hop.

The term 'weight of an edge' may denote a mathematical real value which may be normed to a value between 0 and 1. This way, a differentiation in terms of strength for a relationship between nodes may be defined. There may be strong relationships and comparably weak relationships. Such a differentiation may be instrumental for the sophistication of the knowledge graph. It may be the basis for generating highly differentiated answers using the knowledge graph in combination with question answering techniques.

The term 'type node' may denote a characteristic of a node. One type of nodes may be persistent and may build the backbone structure of the knowledge graph. Branch nodes are regular members of the knowledge graph and my link different parts of the knowledge graph together. Finally, there are leaf nodes that may only have a transitory role in the knowledge graph. These nodes may be marked deletable. It may also be noted that persistent node and branch nodes maybe called core nodes.

The term 'orphan node' may denote a node without edges, i.e., without any links or relationships to other nodes. Such an orphan node may be created if all surrounding edges may be deleted because the related nodes may have been deleted.

The proposed method for deleting a node of a knowledge graph may offer multiple advantages and technical effects:

It may basically allow controlling the physical size and amount of data useful and required for a data graph on knowledge graphs and at the same time keep the information stored in the knowledge graph up to date with the queries involved against the knowledge graph. Outdated or less relevant facts, stored in some of the nodes, may be purged/deleted according to a definable procedure. Thereby, a plurality of different scoring methods may be combined in order to make a final decision for a deletion of a fact in the knowledge graph. Clearly, the deletion of a fact in a node of the knowledge graph is not only based on the age of the node but may involve a relevance scoring of nodes, weights of relationships and the relative importance of nodes for queries against the knowledge graph. All of this may change over time with the queries executed against the knowledge graph, bringing machine learning to life.

The proposed concept is open to combining various assessment methods for a final decision to delete a fact out of a knowledge graph. A provisional delete decision may be refined based on various triggers in order to revert a deletion recommendation within the knowledge graph. This way, the knowledge graph and the related system get relatively close to the plasticity of biological information processing.

At the same time, it may be ensured that the total amount of active data stored in the knowledge graph is not growing exponentially over time so that the related system continues to be able to generate results for queries in a predictable amount of time.

Moreover, the proposed method and system can handle orphan nodes which may be generated if surrounding nodes and relationships are finally deleted from the knowledge graph. Thus, for these orphan nodes new relations to other nodes in the knowledge graph may be established. Hence, it may be ensured that no "dead information" is left in the knowledge graph, so that all information being part of the related knowledge graph continues to be accessible.

In the following, additional embodiments of the method will be described which may also be applicable for the related system.

According to one advantageous embodiment of the method, the first relevance scoring model may comprise one selected out of the group comprising node type distinction, distance between a node to a core node, weight of links, number of read accesses, node attribute, edge attribute, and inheriting from neighboring nodes. This list may be extended depending on the subject matter of the knowledge graph. As a consequence of the base scoring models mentioned above and also the extendability, a large variety of different scoring models may be used. Details of the scoring models will be given below in the context of the figures.

According to a further advantageous embodiment of the method, the second relevance scoring model may comprise one selected out of the same group if compared to the group of the first scoring models, namely, node type distinction, distance between a node to a core node, weight of links, number of read accesses, node attribute, edge attribute and inheriting from neighboring nodes. However, for the second relevance scoring model used it is required that it is different to the first relevance scoring model. This may allow for an even higher flexibility in a determination whether a node in the knowledge graph may be outdated.

It may also be understood that also more than two relevance scoring models may be applied in parallel.

According to one preferred embodiment of the method, the first relevance scoring model and the second relevance scoring model is each determined based on a predefined maximum size of the knowledge graph. This may allow for a limitation of the size of the knowledge graph; thus, it may address the known problem of the unlimited growth of knowledge graphs if no mechanism exists to clean out unused and unnecessary content in the knowledge graph. Different methods for defining the size of the knowledge graph exist: by number of nodes, number of edges, number of nodes ending a tree structure and/or the total storage amount required for the knowledge graph. Also, additional criteria may be used to define the size of the knowledge graph.

According to a useful embodiment, the method may also comprise marking a node as a persistent node or as transitory node. This differentiation may ensure that core nodes having had long-term relevancy will be kept as part of the knowledge graph, whereas other nodes having only a limited importance in a certain period of time may be deleted comparably quickly.

According to one preferred embodiment of the method, a persistent node may comprise an edge number larger than a predefined threshold number of edges and/or a predetermined number of accesses to the persistent node may be larger than a threshold access number. Thus, a persistent node represents itself as having information that is relevant over a longer period of time and in a variety of different contexts.

According to one another preferred embodiment of the method, a transitory node may be accessed less often than a transitory access threshold number in a transitory time after a creation of a node. The transitory access threshold number may be defined depending on the subject of the knowledge graph and also depending on the actual size if compared to a maximum preset size of the knowledge graph. Thus, these parameters are adjustable in order to meet various requirements of the knowledge graph. The nodes "in-between" are called branch nodes.

According to a permissive embodiment of the method, an orphan node may be treated according to one of the methods selected out of the group comprising orphan node remove, fringe only remove, removal based on an edge attribute and back-linking to a persistent node. This selectivity may allow the knowledge graph management system to treat orphan nodes differently under different environmental conditions, like a difference between the actual size of the knowledge graph and the target size of the knowledge graph. In situations, in which the difference is comparably large, only the fringe nodes may be removed and intermediate nodes, which may be deletable between an orphan node and a persistent node, may be kept. In other situations both, the fringe node and the orphan node may be deleted altogether.

According to one permissive embodiment of the method, parameters of each of the first relevance scoring models and the second relevance scoring model may be adapted such that the group of deletable nodes determined by each of the different relevance scoring models may only vary by a predefined percentage. Consequently, the different relevance scoring models deliver comparable results for the deletable nodes. With this, a relative strong amount of redundancy, resulting in high reliability and high consistency of the here proposed expiration method, i.e., scoring model, may be achieved.

According to one additionally advantageous embodiment of the method, an individual weight factor may be assigned to each of the first relevance scoring models. Hence, not only the internal parameters of the relevance scoring models may be dynamically adjustable but also the weight of a relevance scoring model itself. This may allow another degree of freedom in terms of managing the content of the knowledge graph over time.

In the following, a detailed description of the figures will be given. All instructions in the figures are schematic. Firstly, a block diagram of an embodiment of the inventive method for deleting a node of a knowledge graph is given. Afterwards, further embodiments, as well as embodiments of the system for deleting a node of a knowledge graph, will be described.

FIG. 1 shows an embodiment of a flowchart of the inventive method 100 for deleting a node in a knowledge graph. The method 100 comprises receiving, 102, a knowledge graph data comprising nodes and edges. The edges represent relationships between a subset of the nodes in the knowledge graph. The method 100 also comprises determining, 104, a first relevance degree value for a selected one of said nodes based on a combination of node parameters using a first relevance scoring model, determining, 106, a second relevance degree value for the selected node based on a combination of node parameters using a second relevance scoring model, and combining, 108, the first relevance degree value and the second relevance degree value into a final relevance degree for the selected node.

The method comprises additionally marking, 110, the selected node as deletable if the final relevance degree value is above a predefined relevance threshold value, applying, 112, queries against the knowledge graph, wherein at least a certain number of such queries invokes accessing of a node marked as deletable, and revising, 114, at least one of the first relevance degree value and the second relevance degree value based on the accessing of the node marked as deletable. Finally the method comprises deleting, 116, the node marked as deletable if the required conditions are fulfilled, i.e., if over a predetermined period of time queries against the knowledge graph invoke no access—or not enough accesses (below a preset threshold)—to the node marked as deletable.

FIG. 2 shows a graph with an example 200 of expired nodes 204 in the knowledge graph. Non-expired nodes 202 are shown with solid lines. It may also be noted that edges 206 between a non-expired node 202 and an expired node 204 are marked as a dashed line.

FIG. 2 may be an example of the general concept of node expiration. The clean-up process considers the different nature of different nodes. The knowledge graph contains essential nodes, i.e., nodes linked to many other nodes which may be seen as central nodes of persistent nodes in a graphical representation. On the other side peripheral nodes or leaf nodes are shown at the end of tree structures of the knowledge graph, i.e., they are only linked to one or a few nodes. Some of the nodes may be accessed frequently, whereas other nodes are accessed seldom or even only once.

It may be noted that the used nomenclature in FIG. 2 (solid lines for non-expired elements like nodes or edges, dashed lines for expired elements) will be used throughout the rest of the figures and the description.

FIG. 3 shows an embodiment 300 of how to measure the distance to a core node. A persistent node 302—in particular, as defined above—does not expire. Nodes which are connected, with as many as or more edges to a next node than a predefined number (e.g., z=4), are regarded as persistent nodes. Other nodes having a lower number of edges may be seen as expired of the, e.g., node 304 (branch or persistent). Node 306 may already been marked as deletable; therefore, it is marked in a dashed line. The persistent nodes 302 are shown with stripes. Each of the core nodes 302 has 4 edges. i.e., relationships to other nodes which are not yet deleted.

In general, there is a differentiation between persistent nodes (profoundly linked) and leaf nodes (sparsely linked): a persistent node 302 with as many or more edges as a predefined number z (or an alternative definition) represents the core net of nodes in the knowledge graph. Consequently, a node with as many or less edges than a predefined number y (e.g., y=1) represents a leaf node. Furthermore, there are also branch nodes. A branch node may be defined as a node with less links than z but more links to than y. These nodes are shown with solid circles in the figures.

It may be noted that parameter values for attributes may be assigned to the different types of nodes. In one embodiment, persistent nodes may be assigned the value of "1", leaf nodes the value of value "0". Branch nodes receive a value between 0 and 1 depending on the number of links, e.g., by linear interpolation.

Based on this basic schema, a series of different relevance scoring models may be used to derive or determine a relevance degree value:

a) A distinction between a core node and a leaf node may be used as just explained.
b) Another method may be the measurement of the distance of a node to a core node which may be expressed in the number of edges forming the path from the node in question to the nearest core or persistent node.
c) A further scoring model may be an evaluation of the weights of the edges directly attached and weights of the edges forming a path from the node in question to a persistent note. For this, the edges in the knowledge graph have a defined weight which indicates the significance of the edge or level of proximity of the adjacent node. For gauging the level of persistence of a node, these weights can be used.

In one implementation or embodiment similar to scoring model a), however, instead of counting edges, the sum of weights of the edges is taken as a criterion to distinguish between persistent nodes, branch nodes and leaf nodes.

And another embodiment or implementation similar to the scoring model b), however, the sum of the weights along the path (instead of the length of the path) to the next persistent node is used to identify expired nodes.

d) Another scoring model is based on the number of read access operations. Transitory nodes can be characterized by holding information which is retrieved only once or a few times shortly after the node has been created. In this way, expired nodes are identified as not being subject to a read access for a predefined period of time. A read access is defined as either a node attribute of an accessed node (reading the content of the node) or a path is followed traversing the node.

e) A further scoring model is based on an attribute of a node (type of note). Nodes with a certain combination of attributes—in particular, holding a certain set of data—can be regarded as transitory. The set of attributes can either be predefined or, which is the preferred way, can be created and modified continuously during the operation by classifying the nodes which are regarded as expirable (or expired) by the scoring model according to a) to d) above.

f) Again, another scoring model is based on inheriting from neighbors. As a node in the knowledge graph serves only in its context/by its edges, nodes can be regarded as expired if a certain percentage (e.g., 80%, other values possible) of the direct neighbors (or neighbors in a predefined radius) are regarded as expired. Thus, if a certain area of the knowledge graph holds the relative high level of expired nodes, the area is regarded as expired. As for e) this kind of secondary scoring model requires a primary scoring model like a) to d) above.

g) A further scoring model is based on attributes of the edges (type of relation). Nodes connected to others through given relation types—i.e., edged types—can be considered as transitory or more transitory than others. The type of relation and the relative threshold can be either predefined or created and modified continuously during the operation of the updated knowledge graph.

Once, one or more nodes are identified as expired, the related system can act by removing the nodes and their direct edges and can (momentarily) refrain from removing the nodes for the sake of continuous efficiency improvements. In this case, read accesses to expired nodes are monitored. A read access (any of frequent) to an expired node indicates that a removal might impact the value of the knowledge graph. Also, a read access to persistent nodes (i.e., persistent or branch nodes) can be monitored. In case certain nodes regarded as persistent are not accessed, they should be considered as branch node and finally as leaf node which may be classified as transitory node by the scoring models.

FIG. 4 shows an embodiment of a more technically detailed flowchart 400 of different expiration processes.

Generally, different implementation methods are applied to distinguish transitory form persistent nodes in the knowledge graph. Transitory nodes can be removed from the knowledge graph without significant impact on the integrity of the knowledge graph. The removal is essential for ensuring the performance of the cognitive system and controlling the storage size.

Depending on the implementation of the method and the respective system, various scoring models can be selected and combined:

Basic implementation: Only a single scoring model is selected and applied.

Advanced implementation: Several of all scoring models are applied. The individual result of each scoring model (node expired or not expired) can be combined with a logical operation like "AND" (all scoring models should yield the result that a certain node is expired) or "OR" (at least one scoring model must yield the result that certain node is expired) to regard the node as expired.

Ultimate implementation: Several or all scoring models are applied. A predetermined weight factor is applied to the result of each relevance degree value. The sum is normalized to the value of the range zero (0=not to be expired) to one (1=expired). If a normalized value of a certain node exceeds a predetermined value (e.g., 0.5, other values possible), the node is regarded to be expired and thus to be deleted.

The scoring models for these different implementation types have been discussed in the context of FIG. 3 already.

Depending on the implementation type of the exploration model (basic, advanced, ultimate, the following changes can be applied to the scoring models during the evaluation:

(1) The parameters of the currently used scoring model are adopted. For instance: if too many nodes are marked as expired, i.e., deletable, and later utilized in a read operation, i.e., read access, the parameters are changed in such a way that less nodes are regarded as transitory, e.g., for scoring model (b) the maximum allowed path links to the next core node is increased.

(2) Parameters are adopted for each scoring model individually and/or the logical combination of the result is changed.

(3) Parameters are adopted for each scoring model individually and all the weights combining the individuals scoring model values into a general score value are changed.

In case of the basic implementation, the direction of parameter change is obvious (e.g., increase or decrease the maximum allowed path links to a persistent node). In case of the advanced implementation and the ultimate implementation, the amount of possible changes is rather large, the evaluation either of them may try (test-wise) a possible change and evaluate the impact of the change. Over several cycles of applying the changed scoring model, analysis and change, the best way to change multiple parameters evolves.

The general level of the parameters, i.e., whether only a marginal or a substantial part of the knowledge graph should be deleted, can be adjusted by adhering to a general limitation, for instance: a maximum number of nodes or edges sustained in the knowledge graph or the total amount of storage space used by the knowledge graph.

Returning back to FIG. 4, the process may be started by an external trigger, 402, e.g., the storage space for the knowledge graph may be reached or exceeded. The scoring models to identify transitory nodes are applied, 404. Depending on the implementation (basic, advanced, ultimate), the set of expired nodes, 406, is either completely removed, 408, or remove partially, 410, or the process/system may refrain from a removal, 412.

Next, read access to the nodes may be monitored, 414. Based on this, statistics are created, 416, and expired nodes with read access are categorized into one category, whereas non-expired nodes without read access are categorized in another category. In a next step, 418, the different scoring models for a re-activation/deactivation of nodes may be applied, combined with a potential change of the parameters, as explained above. Based on this, expired nodes are removed, 420 or, the process/system refrains from removing, 422.

This process may be reiterated, 424, after a predefined period of time or after the external trigger 402 signals again that a determination of transitory nodes which may be deletable or can be deleted is due.

FIG. 5 shows an embodiment 500 for scoring models in a knowledge graph in a graphical way. In contrast to the nodes, which are shown as circles, the scoring models are shown as hexagons:

(a) distinguishing between core nodes and leaf nodes;
(b) measuring the distance of a node to a persistent node;
(c) evaluating the weight of the edges;
(d) number of read access operations to a note;
(e) attribute of a node (type of a node); and
(f) inheriting from neighboring nodes.

In the diagram of the embodiment 500 each scoring model is represented by a hexagon node. For the sake of clarity of the underlying idea, the scoring model g) "attribute of the edge ("type of the relation") is not shown in the diagram. The attributes of the nodes are the parameters (e.g., variables z and y of scoring model (a).

The edges connecting the four primary scoring models a, b, c and d (denoted by bold lines) represent the level of likeliness delivering the same result (transitory or persistent) for the nodes of the target knowledge graph to be evaluated. For instance, if two methods have yielded always the same result for each node evaluated in the target knowledge graph, the connecting edge has the weight 1. If two scoring models have come for each node evaluated in the target knowledge graph always to a different result (in a preset time period), the weight would be 0. If half the results have matched, the weight would be 0.5.

The edges connecting the four primary scoring models a), b), c) and d) with the secondary scoring model e) and f) (denoted as thinner lines) indicate the information transfer from the primary scoring model to the secondary scoring model, i.e., for scoring model (e): which attributes of nodes scoring models a), b), c) and d) have found to be characteristic to the transitory nodes and for method (f): which nodes are regarded to be expired, so that their vicinity can be scanned for orphan nodes.

The evaluation algorithm aims to improve the scoring model of the knowledge graph (which is—over time—be converted to the target knowledge graph) in such a way that the six edges between the four primary scoring models have the same or similar (with threshold) weight value, i.e., the various scoring models come with a high likelihood to the same result (transitory or persistent) for the nodes in the target knowledge graph to be evaluated.

The following figures—in particular, FIGS. 6, 7, 8, 9, 10, 11 and 12—are examples of target knowledge graphs. For the sake of display, the advanced implementation method was selected, i.e., the scoring model returns either "expired" or "not-expired".

FIG. 6 shows an embodiment of a target knowledge graph 600 to be evaluated. The first scoring model a) "distinguishing between core nodes and leaf nodes" is applied with the parameters: z=4 (a persistent node has at least four edges) and y=2 (a leaf node has one or two edges, i.e., a branch node has three edges). Five nodes on the right-hand side may be identified as transitory nodes and marked as expired. This is shown in FIG. 7.

FIG. 7 shows an embodiment 700 of an application of an expiration method to the target knowledge graph. Persistent nodes 702 are shown as striped nodes. Transitory nodes 706 are shown as dashed circles, and branch nodes 704 are shown as circles with solid lines.

FIG. 8 shows an embodiment 800 of an application of scoring model b) to the knowledge graph, i.e., "measuring the distance of a node to a persistent node (number of edges forming the path)". Nodes which are connected with five or more edges (links or hops—see above) to the next persistent node are regarded as expired (z=5). For the sake of this example, the number of edges is by purpose selected as to high. Hence, only one node is regarded as expired. The nodes having a dot in its center together with their related edges are positioned in the path between the node in question (note 802) and the next persistent node (striped) do not qualify for the z=5 condition.

FIG. 9 shows an embodiment 900 of an application of scoring model d) to the knowledge graph. This scoring model "number of read access operations" is applied which identifies the outer five nodes on the right-hand side as expired (dashed circles).

For the sake of clarity, only the three scoring models a), b) and d) are shown in the method knowledge graphs. The edges connecting the five nodes on the left-hand side of the target knowledge graph are not taken into account because all three scoring models regard these five nodes as persistent.

In the figures above, a dashed border denotes an expired node, as already mentioned. In FIG. 10, the result of a scoring model is shown by a solid line ("node not expired") or a dashed line ("not expired").

FIG. 10 shows an embodiment 1000 of linking the nodes of the target knowledge graph using examples of the various expiration or scoring models. Again, the hexagon nodes denote the different scoring models a), b) and d), wherein the circles denote the nodes of the knowledge graph.

The links in the knowledge graph between the three scoring models carry as weight the consistency of the node evaluation (thick lines). Scoring models a) and b) yielded a different result for four nodes of the knowledge graph, i.e., only 15 out of 11 nodes received the same evaluation. The same level of inconsistency is observed between scoring model b) and d), whilst scoring models a) and d) came to a more consistent result. To achieve a better balance of the knowledge graph, the evaluation algorithm aims to alter the parameters of scoring model b).

As scoring model b) identified only one expired node, the improvement mechanism reduces the parameter "number of links connecting to the next persistent node triggering exploration" from z=5 to z=2.

FIG. 11 shows an embodiment 1100 of an application of scoring model b) with z=2. After this parameter change, scoring models b) and d) yield the same result and the knowledge graph is better balanced, as shown below in FIG. 12.

FIG. 12 shows the result 1200 with a percentage values comparing the different scoring models a), b) and d).

FIG. 13 shows an embodiment 1300 of how removing nodes can create an orphan node. It may now be considered, in this example, that the logical operation AND (all methods must yield the same result that a certain node is expired) for the advanced implementation. As shown, the four dashed nodes are expired and will be removed from the knowledge graph. This leaves the branch node 1302 as orphan node.

Depending on the implementation option (basic, advance, ultimate) the process/system can deal with orphan nodes in various ways:

(i) All orphan nodes can simply be removed. However, this approach could actually result in a removal of a substantial part of the target knowledge graph if it is only sparsely linked with the main part of the knowledge graph and the linking nodes are expired. This could be considered as intended and efficient. But it could also be considered as harmful.

(ii) Expiring nodes bringing the orphan nodes are not removed, i.e., only fringes of the target knowledge graph are removed, i.e., areas containing only expired nodes.

(iii) Scoring model f) could be applied as a kind of moderate approach in comparison to the two prior options. Orphan nodes surrounded by many expired nodes would be removed; and the expired node connecting two parts of the target knowledge graph would remain.

(iv) Orphan nodes are linked directly to the nearest remaining neighbor. The weight of the link (edge) and other attributes of the link must be assembled from the edges forming the connection via the expired node(s). A possible way to assign weights to the replacement edges is to consider graph centrality and assign a link or combination of links that have a value of the weights so that the graph centrality of the orphan node before and after the removal of the expired nodes remains equal.

FIG. 14 shows an embodiment of a node expiration processor 1400—also denoted as system for deleting a node of a knowledge graph—in the context of a cognitive engine and the knowledge graph. The system 1400 for deleting a node of a knowledge graph comprises a storage 1402 for storing a knowledge graph data comprising nodes and edges. Also here, the edges represent relationships—in particular edges—between a subset of the nodes.

The system comprises also a first determining unit 1404 adapted for determining a first relevance degree value for a selected one of the nodes based on a combination of node parameters using a first relevance scoring model, a second determining unit 1406 adapted determining a second relevance degree value for the selected node based on a combination of node parameters using a second relevance scoring model, and a combination module 1408 adapted for combining said first relevance degree value and said second relevance degree value into a final relevance degree for said selected node.

The system 1400 comprises additionally a marking unit 1410 adapted for marking the selected node as deletable if said final relevance degree value is above a predefined relevance threshold value, a query module 1412 adapted for applying queries against said knowledge graph, wherein at least a certain number of such queries invokes accessing of a node marked as deletable, and a revising system 1414 adapted for revising at least one of the first relevance degree value and the second relevance degree value based on said accessing of the node marked as deletable.

Finally, the system comprises a deletion module 1416 adapted for deleting the node marked as deletable if over a predetermined period of time queries against the knowledge graph invoke no access of said node marked as deletable.

Embodiments of the invention may be implemented together with virtually any type of computer, regardless of the platform being suitable for storing and/or executing program code. FIG. 15 shows, as an example, a computing system 1500 suitable for executing program code related to the proposed method.

The computing system 1500 is only one example of a suitable computer system and is not intended to suggest any limitation as to the scope of use or functionality of embodiments of the invention described herein. Regardless, computer system 1500 is capable of being implemented and/or performing any of the functionality set forth hereinabove. In the computer system 1500, there are components, which are operational with numerous other general purpose or special purpose computing system environments or configurations. Examples of well-known computing systems, environments, and/or configurations that may be suitable for use with computer system/server 1500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1500 may be described in the general context of computer system-executable instructions, such as program modules, being executed by a computer system 1500. Generally, program modules may include routines, programs, objects, components, logic, data structures, and so on that perform particular tasks or implement particular abstract data types. Computer system/server 1500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1500 is shown in the form of a general-purpose computing device. The components of computer system/server 1500 may include, but are not limited to, one or more processors or processing units 1502, a system memory 1504, and a bus 1506 that couples various system components including system memory 1504 to the processor 1502. Bus 1506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1500 typically includes a variety of computer system readable media. Such media may be any available media that is accessible by computer system/server 1500, and it includes both, volatile and non-volatile media, removable and non-removable media.

The system memory 1504 may include computer system readable media in the form of volatile memory, such as random access memory (RAM) 1508 and/or cache memory 1510. Computer system/server 1500 may further include other removable/non-removable, volatile/non-volatile computer system storage media. By way of example only, storage system 1512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1506 by one or more data media interfaces. As will be further depicted and described below, memory 1504 may include at least one program product having a set (e.g., at least one) of program modules that are configured to carry out the functions of embodiments of the invention.

The program/utility, having a set (at least one) of program modules 1516, may be stored in memory 1504 by way of example, and not limitation, as well as an operating system, one or more application programs, other program modules, and program data. Each of the operating system, one or more application programs, other program modules, and program data or some combination thereof, may include an implementation of a networking environment. Program modules 1516 generally carry out the functions and/or methodologies of embodiments of the invention as described herein.

The computer system/server 1500 may also communicate with one or more external devices 1518 such as a keyboard, a pointing device, a display 1520, etc.; one or more devices that enable a user to interact with computer system/server 1500; and/or any devices (e.g., network card, modem, etc.) that enable computer system/server 1500 to communicate with one or more other computing devices. Such communication can occur via Input/Output (I/O) interfaces 1514. Still yet, computer system/server 1500 may communicate with one or more networks such as a local area network (LAN), a general wide area network (WAN), and/or a public network (e.g., the Internet) via network adapter 1522. As depicted, network adapter 1522 may communicate with the other components of computer system/server 1500 via bus 1506. It should be understood that although not shown, other hardware and/or software components could be used in conjunction with computer system/server 1500. Examples, include, but are not limited to: microcode, device drivers, redundant processing units, external disk drive arrays, RAID systems, tape drives, and data archival storage systems, etc.

Additionally, the system 1400 for deleting a node of a knowledge graph may be attached to the bus system 1506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be a system, an apparatus, a device, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 16, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 16 are intended to be illustrative only and that computing nodes 1210 and cloud computing environment 1250 can communicate with any type of computerized device over any type of network and/or network addressable connection (e.g., using a web browser).

Referring now to FIG. 17, a set of functional abstraction layers provided by cloud computing environment 1250 (FIG. 16) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and deleting a node of a knowledge graph 1296.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The invention claimed is:

1. A method for deleting a node of a knowledge graph, said method comprising:
    receiving knowledge graph data comprising nodes and edges, said edges representing relationships between a subset of said nodes;
    determining a first relevance degree value for a selected one of said nodes based on a combination of node parameters using a first relevance scoring model;
    determining a second relevance degree value for said selected node based on a combination of node parameters using a second relevance scoring model;
    combining said first relevance degree value and said second relevance degree value into a final relevance degree for said selected node;
    marking said selected node as deletable if said final relevance degree value is above a predefined relevance threshold value;
    applying queries against said knowledge graph, wherein at least a certain number of such queries invokes accessing of a node marked as deletable;
    revising at least one of said first relevance degree value and said second relevance degree value based on said accessing of said node marked as deletable;
    deleting said node marked as deletable if over a predetermined period of time queries against said knowledge graph invoke no access of said node marked as deletable; and marking a node as a persistent node or as transitory node, wherein a persistent node comprises an edge number larger than a predefined threshold number of edges, and/or a predetermined number of accesses to said persistent node is larger than a threshold access number, wherein a transitory node is accessed less often than a transitory access threshold number in a transitory time after a creation of a node, wherein an orphan node is treated according to one of said methods selected out of the group comprising orphan node remove, fringe only remove, removal based on an edge attribute and back-linking to persistent node.

2. The method according to claim 1, wherein said first relevance scoring model comprises one selected out of the group comprising node type distinction, distance between a node to a core node, weight of links, number of read accesses, node attribute, edge attribute and inheriting from neighboring nodes.

3. The method according to claim 2, wherein parameters of each of said first relevance scoring models is adapted such that said group of deletable nodes of each of said different scoring models vary only by a predefined percentage.

4. The method according to claim 2, wherein an individual weight factor is assigned to each of said first relevance scoring models.

5. The method according to claim 1, wherein said second relevance scoring model comprises one selected out of the group comprising node type distinction, distance between a node to a core node, weight of links, number of read accesses, node attribute, edge attribute and inheriting from neighboring nodes, wherein said second scoring model is different to said first scoring model.

6. The method according to claim 1, wherein said first relevance scoring model and said second relevance scoring model is determined based on a predefined maximum size of said knowledge graph.

7. A system for deleting a node of a knowledge graph, said system comprising:
   a computer system comprising: a computer processor, a computer-readable storage medium, and program instructions stored on the computer-readable storage medium being executable by the processor;
   a storage medium for storing a knowledge graph data comprising nodes and edges, said edges representing relationships between a subset of said nodes;
   a first determining unit adapted for determining a first relevance degree value for a selected one of said nodes based on a combination of node parameters using a first relevance scoring model;
   a second determining unit adapted determining a second relevance degree value for the selected node based on a combination of node parameters using a second relevance scoring model;
   a combination module adapted for combining said first relevance degree value and said second relevance degree value into a final relevance degree for said selected node;
   a marking unit adapted for marking said selected node as deletable if said final relevance degree value is above a predefined relevance threshold value;
   a query module adapted for applying queries against said knowledge graph, wherein at least a certain number of such queries invokes accessing of a node marked as deletable;
   a revising system adapted for revising at least one of said first relevance degree value and said second relevance degree value based on said accessing of said node marked as deletable; and
   a deletion module adapted for deleting said node marked as deletable if over a predetermined period of time queries against said knowledge graph invoke no access of said node marked as deletable;
   marking a node, using the marking unit, as a persistent node or as transitory node, wherein a persistent node comprises an edge number larger than a predefined threshold number of edges and/or a predetermined number of accesses to said persistent node is larger than a threshold access number, wherein a transitory node is accessed less often than a transitory access threshold number in a transitory time after a creation of a node.

8. The system according to claim 7, wherein said first relevance scoring model comprises one selected out of the group comprising node type distinction, distance between a node to a core node, weight of links, number of read accesses, node attribute, edge attribute and inheriting from neighboring nodes.

9. The system according to claim 8, wherein parameters of said each of said first relevance scoring models is adapted such that said group of deletable nodes of each of said different scoring models vary only by a predefined percentage.

10. The system according to claim 7, wherein said second relevance scoring model comprises one selected out of the group comprising node type distinction, distance between a node to a core node, weight of links, number of read accesses, node attribute, edge attribute and inheriting from neighboring nodes, wherein said second scoring model is different to said first scoring model.

11. The system according to claim 7, wherein said first relevance scoring model and said second relevance scoring model is determined based on a predefined maximum size of said knowledge graph.

12. The system according to claim 7, wherein an orphan node as treated according to one of said methods selected out of the group comprising orphan node remove, fringe only remove, removal based on an edge attribute and back-linking to a persistent node.

13. A computer program product for deleting a node of a knowledge graph, said computer program product comprising a computer readable storage medium having program instructions embodied therewith, said program instructions being executable by one or more computing systems to cause said one or more computing systems to:
   receive knowledge graph data comprising nodes and edges, said edges representing a relationships between a subset of said nodes;
   determine a first relevance degree value for a selected one of said nodes based on a combination of node parameters using a first relevance scoring model;
   determine a second relevance degree value for said selected node based on a combination of node parameters using a second relevance scoring model;
   combine said first relevance degree value and said second relevance degree value into a final relevance degree for said selected node;
   mark said selected node as deletable if said final relevance degree value is above a predefined relevance threshold value;

apply queries against said knowledge graph, wherein at least a certain number of such queries invokes accessing of a node, marked as deletable;
revise at least one of said first relevance degree value and said second relevance degree value based on said accessing of said node marked as deletable;
delete said node, marked as deletable, if over a predetermined period of time queries against said knowledge graph invoke no access of said node, marked as deletable; and
mark a node as a persistent node or as transitory node, wherein a persistent node comprises an edge number larger than a predefined threshold number of edges, and/or a predetermined number of accesses to said persistent node is larger than a threshold access number, wherein a transitory node is accessed less often than a transitory access threshold number in a transitory time after a creation of a node, wherein an orphan node is treated according to one of said methods selected out of the group comprising orphan node remove, fringe only remove, removal based on an edge attribute and back-linking to persistent node.

* * * * *